United States Patent
Morris et al.

(10) Patent No.: US 10,058,805 B2
(45) Date of Patent: Aug. 28, 2018

(54) RIPCORD LOCKING METHODS

(71) Applicant: Caterpillar Inc., Peoria, IL (US)

(72) Inventors: Bryant Morris, Peoria, IL (US); Sam Oanes, Dunlap, IL (US); Jeffrey Ries, Metamora, IL (US)

(73) Assignee: Caterpillar Inc., Deerfield, IL (US)

(*) Notice: Subject to any disclaimer, the term of this patent is extended or adjusted under 35 U.S.C. 154(b) by 389 days.

(21) Appl. No.: 14/927,548

(22) Filed: Oct. 30, 2015

(65) Prior Publication Data

US 2017/0120171 A1   May 4, 2017

(51) Int. Cl.
| | | |
|---|---|---|
| *B01D 35/30* | (2006.01) | |
| *B01D 29/96* | (2006.01) | |
| *B01D 46/00* | (2006.01) | |
| *B01D 46/24* | (2006.01) | |
| *B01D 46/42* | (2006.01) | |

(Continued)

(52) U.S. Cl.
CPC ............ *B01D 29/96* (2013.01); *B01D 35/30* (2013.01); *B01D 46/0004* (2013.01); *B01D 46/0005* (2013.01); *B01D 46/0031* (2013.01); *B01D 46/2411* (2013.01); *B01D 46/4227* (2013.01); *F16B 2/08* (2013.01); *F16B 2/14* (2013.01); *F16L 37/148* (2013.01); *B01D 2201/291* (2013.01); *B01D 2201/40* (2013.01); *B01D 2265/02* (2013.01); *B01D 2265/027* (2013.01)

(58) Field of Classification Search
CPC ............... B01D 29/96; B01D 46/4227; B01D 46/0005; B01D 46/2411; B01D 46/0004; B01D 46/0031; B01D 2265/02; B01D 2265/027; B01D 2201/291; B01D 2201/40; B01D 35/30; F16B 2/08; F16B 2/14; F16L 37/148

See application file for complete search history.

(56) References Cited

U.S. PATENT DOCUMENTS

| 1,696,367 A | 12/1928 | Stephens |
|---|---|---|
| 2,013,660 A | 9/1935 | Lauer |

(Continued)

FOREIGN PATENT DOCUMENTS

| CN | 203861987 U | 10/2014 |
|---|---|---|
| EP | 2131090 | 12/2009 |

(Continued)

*Primary Examiner* — Amber Rose Orlando
*Assistant Examiner* — Britanny E. Precht
(74) *Attorney, Agent, or Firm* — Hibshman Claim Construction PLLC

(57) ABSTRACT

A connection includes a first component, a second component, a cord member, a detent, and a catch assembly. The first component has an opening with an inner surface and a first annular groove disposed about the inner surface. The second component has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to secure the first component to the second component. The detent is disposed on the cord member. The catch assembly is configured to engage the detent and provide resistance to movement of the cord member relative to the catch assembly.

15 Claims, 6 Drawing Sheets

(51) Int. Cl.
*F16B 2/08* (2006.01)
*F16B 2/14* (2006.01)
*F16L 37/14* (2006.01)

(56) References Cited

U.S. PATENT DOCUMENTS

| | | | |
|---|---|---|---|
| 2,403,368 A | 7/1946 | Howard | |
| 4,293,148 A * | 10/1981 | Milberger | E21B 17/046 285/305 |
| 4,697,947 A * | 10/1987 | Bauer | E21B 17/046 285/305 |
| 4,749,192 A | 6/1988 | Howeth | |
| 4,989,636 A * | 2/1991 | Hunter | B01D 35/14 137/557 |
| 5,286,135 A * | 2/1994 | James | F16B 3/04 403/319 |
| 5,498,042 A * | 3/1996 | Dole | F16L 37/148 285/148.27 |
| 6,179,347 B1 * | 1/2001 | Dole | F16L 37/0987 285/305 |
| 6,739,629 B2 * | 5/2004 | Riedy | F16L 37/148 285/305 |
| 8,764,067 B2 * | 7/2014 | Bundy | F16L 37/148 285/305 |
| 2003/0234536 A1 | 12/2003 | Riedy et al. | |
| 2007/0246936 A1 * | 10/2007 | Jeltsch | F16L 25/0045 285/319 |
| 2010/0146748 A1 * | 6/2010 | Desjardins | B01D 46/0004 24/506 |
| 2014/0102057 A1 | 4/2014 | Nepsund et al. | |
| 2014/0319824 A1 * | 10/2014 | Manning | F16L 37/148 285/321 |
| 2015/0273371 A1 | 10/2015 | Morris et al. | |
| 2016/0211574 A1 * | 7/2016 | Dundorf | H01Q 1/42 |

FOREIGN PATENT DOCUMENTS

| | | | |
|---|---|---|---|
| EP | 2131090 A2 * | 12/2009 | F16L 37/148 |
| IN | 200801003 | 12/2008 | |

* cited by examiner

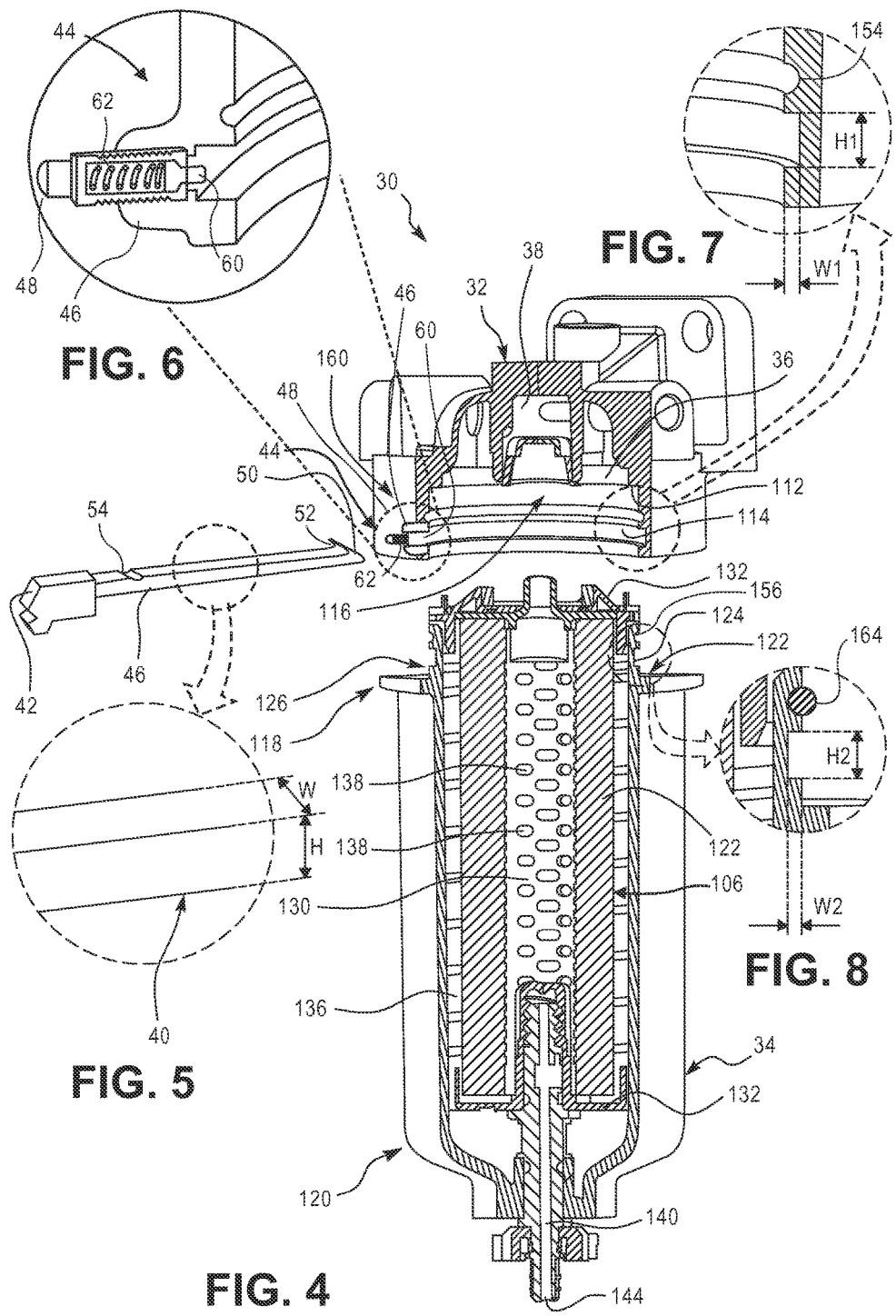

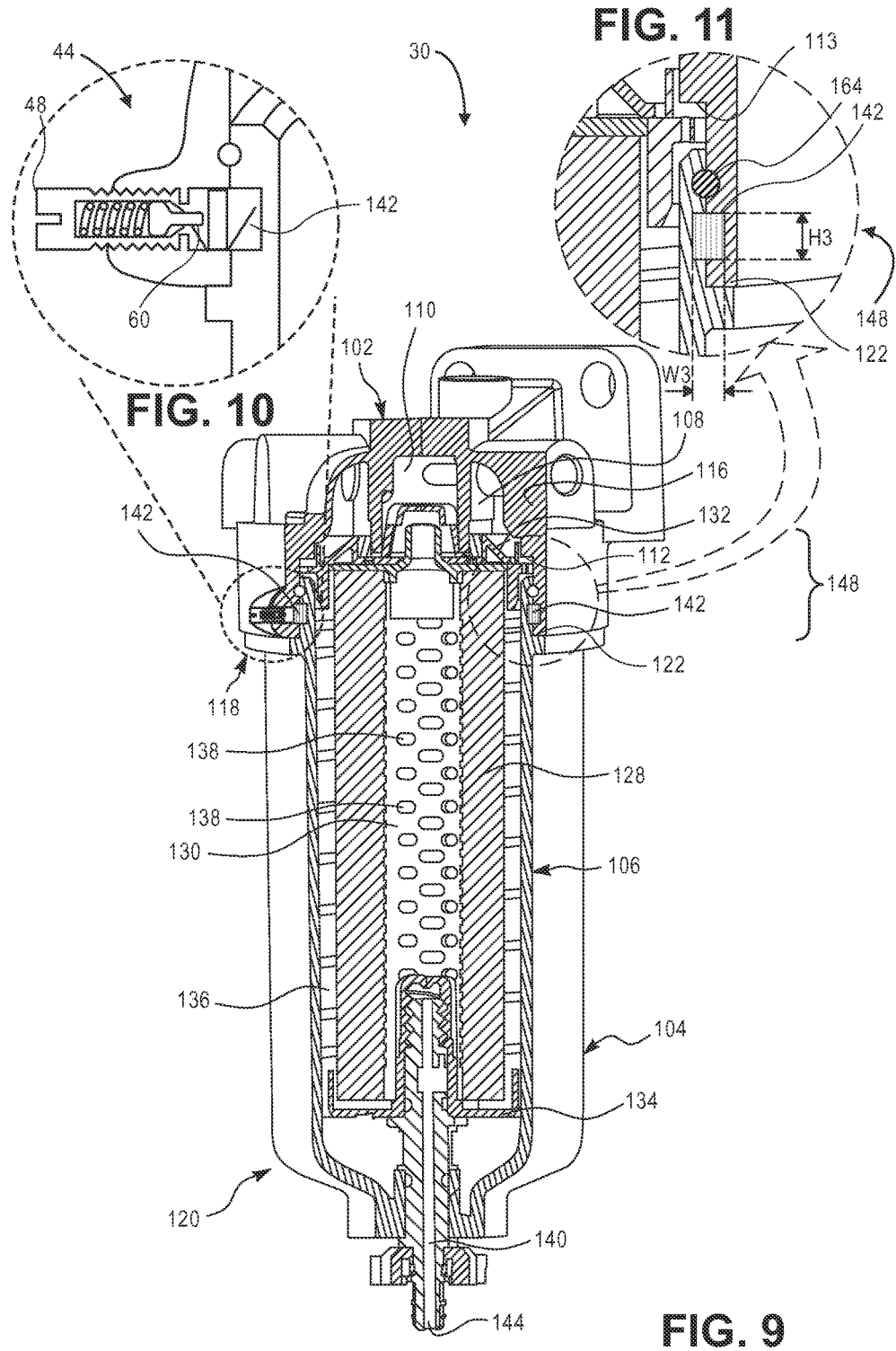

RIPCORD LOCKING METHODS

TECHNICAL FIELD

This patent disclosure relates generally to a filter assembly and, more particularly, to a connection between a base and housing of the filter assembly.

BACKGROUND

Filter assemblies are known in the art for use in various applications, for example, internal combustion engines, hydraulic or pneumatic systems, and the like. These filter assemblies may be used to filter fluids in fuel systems, lubrication oil systems, hydraulic oil systems, air or exhaust filtration systems etc. There are different types of filters, such as canister type of filters, spin-on type of filters, etc. Servicing of such filter assemblies at regular intervals is important, as filter elements in these filter assemblies may tend to get clogged by impurities of the fluid being filtered, and may require replacement.

U.S. Pat. No. 6,726,738 (hereinafter "the '738 patent"), entitled "Air Filter Assembly," describes a filter assembly with a clasp assembly to connect a filter element to a filter housing. This clasp includes a "V" shaped band that acts to compress flanges on the filter element and filter housing together. However, the band is conventional in the sense that it is similar to conventional compression bands used to secure lids to barrels. Such bands are subject accidental opening unless secured. The bands are also susceptible to the elements and may rust or otherwise degrade over time. The '738 patent does not provide any remedies for these failings of conventional compression bands.

Accordingly, there is a need for an improved connection to address the problems described above and/or problems posed by other conventional approaches.

SUMMARY

The foregoing needs are met, to a great extent, by the present disclosure, wherein aspects of an improved connection are provided.

In one aspect, the disclosure describes a connection. The connection includes a first component, a second component, a cord member, a detent, and a catch assembly. The first component has an opening with an inner surface and a first annular groove disposed about the inner surface. The second component has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to secure the first component to the second component. The detent is disposed on the cord member. The catch assembly is configured to engage the detent and provide resistance to movement of the cord member relative to the catch assembly.

In another aspect, the disclosure describes a filter assembly. The filter assembly includes a base, a filter housing, a cord member, a detent, and a catch assembly. The base has an opening with an inner surface and a first annular groove disposed about the inner surface. The filter housing has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to secure the base to the filter housing. The detent is disposed on the cord member. The catch assembly is configured to engage the detent and provide resistance to movement of the cord member relative to the catch assembly.

In yet another aspect, the disclosure describes a cord member. The cord member includes a first end, a second end and a body. The body is disposed between the first end and the second end. The body has a length, height, width, and a detent is disposed in the body. The detent is configured to facilitate providing resistance to movement of the cord member relative to a catch assembly.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

BRIEF DESCRIPTION OF THE DRAWINGS

FIG. 4 is a front sectional view of the filter assembly in a disassembled condition according to an aspect of the disclosure;

FIG. 5 is an enlarged perspective view of a cord member according to an aspect of the disclosure;

FIG. 6 is an enlarged perspective view of a catch assembly according to an aspect of the disclosure;

FIG. 7 is an enlarged perspective view of a first groove to receive the cord member according to an aspect of the disclosure;

FIG. 8 is an enlarged perspective view of a second groove to receive the cord member according to an aspect of the disclosure;

FIG. 9 is a front sectional view of the filter assembly in an assembled condition according to an aspect of the disclosure;

FIG. 10 is an enlarged perspective view of the catch assembly with the cord member according to an aspect of the disclosure;

FIG. 11 is an enlarged perspective view of a connection formed by the cord member and the first and second groove according to an aspect of the disclosure;

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
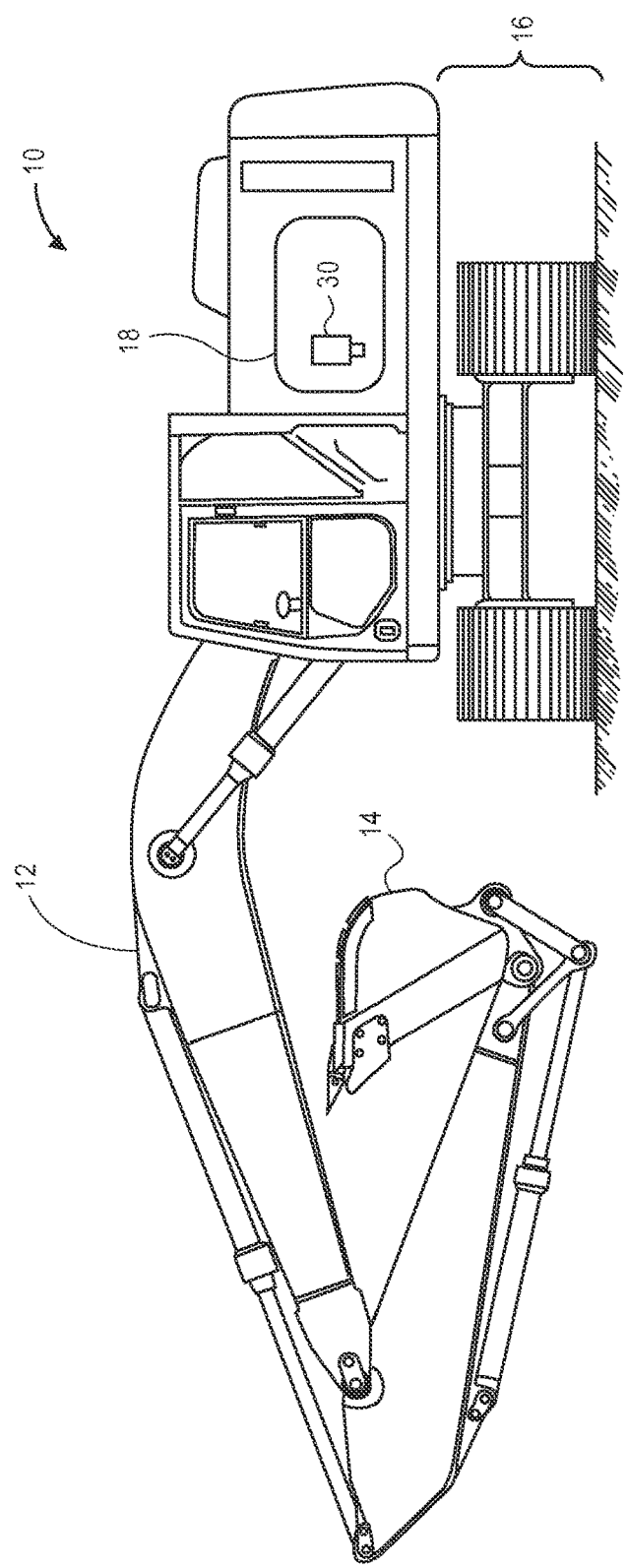
FIG. 1 is a view of an exemplary machine according to an aspect of the disclosure.

The present disclosure relates to a filter assembly. FIG. 1 illustrates a machine 10 that is suitable for use with aspects of the disclosure and has various systems and components that cooperate to accomplish a task. The machine 10 may embody a fixed or mobile machine that performs some type of operation associated with an industry such as mining, construction, farming, transportation, power generation, or another industry known in the art. For example, the machine 10 may be an earth moving machine such as an excavator (shown in FIG. 1), a dozer, a loader, a backhoe, a motor grader, a dump truck, or another earth moving machine. The machine 10 may include an implement system 12 configured to move a work tool 14, a drive system 16 for propelling the machine 10, a power source 18.

In a particular example, the power source 18 includes an engine configured to combust a fuel such as diesel and this fuel is filtered at a filter assembly 30. As fuel passes through the filter assembly 30, contaminants such as water, debris, and the like are filtered out and collect in the filter assembly 30. Periodically, the filter assembly 30 is inspected to determine if a filter medium (described further herein) disposed within the filter assembly 30 should be replaced. For example, if sufficient debris has collected on the filter medium, the filter medium may be replaced. As described herein, it is an advantage of aspects of the filter assembly 30 that the filter assembly 30 is easier and less time consuming to inspect and replace the filter medium than conventional filter cartridges. These and other advantages are described herein. Of note, while particular example is made throughout of filtering fuel, the various aspects are not limited to filtering fuel, but rather, include any suitable filtering application. Examples of suitable filtering applications include hydraulic, lubricant, air, or other such filtration systems.

Figures 2, 3:
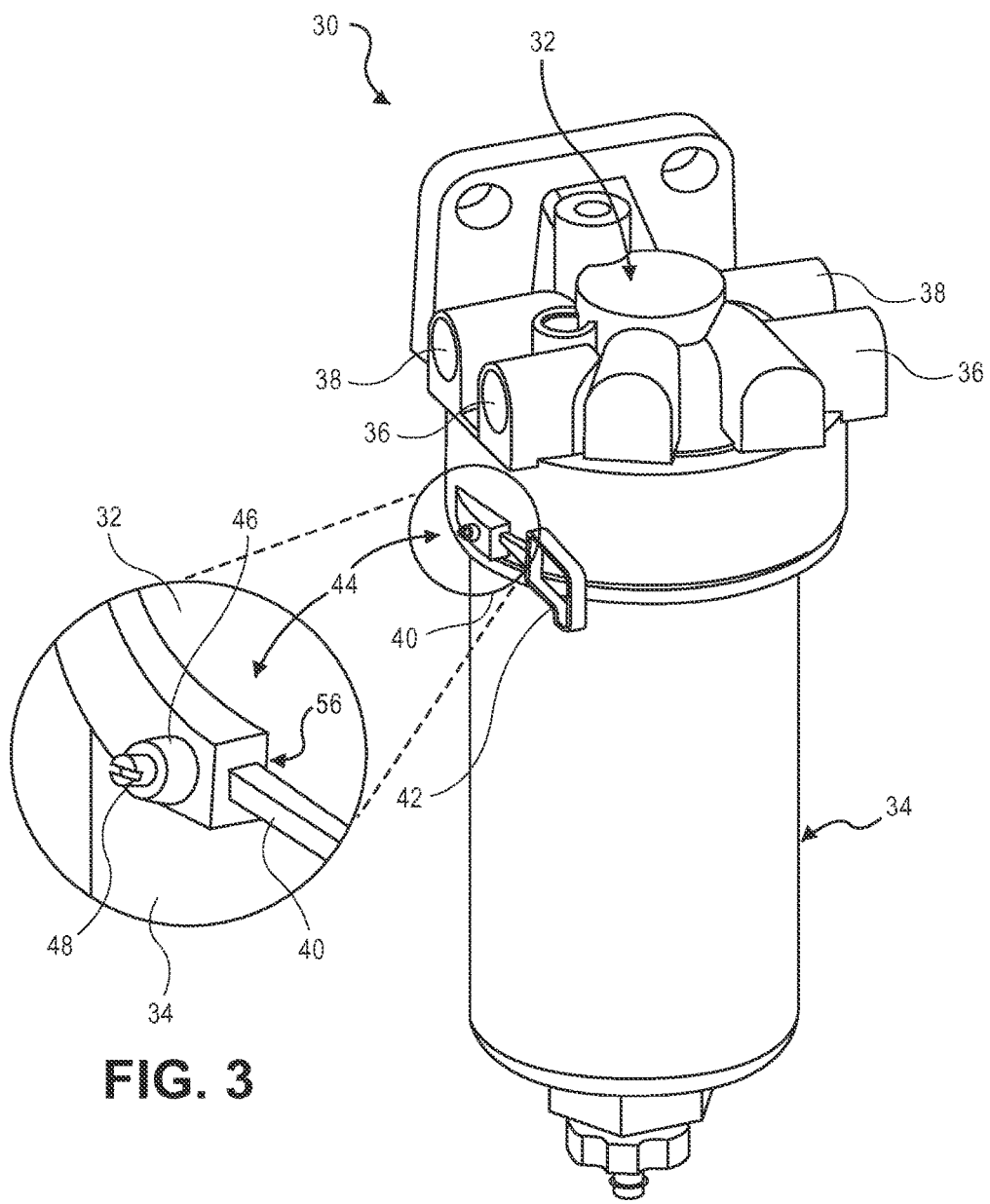
FIG. 2 is a perspective view of a filter assembly according to an aspect of the disclosure.
FIG. 3 is an enlarged perspective view of a catch assembly according to an aspect of the disclosure.

FIG. 2 illustrates a perspective view of a filter assembly 30 according to an aspect of the present disclosure. The filter assembly 30 is embodied as a canister type filter assembly. However, in another aspect, the filter assembly 30 includes any suitable type of filter assembly known in the art. The filter assembly 30 may be used in equipment such as internal combustion engines, pneumatic systems, hydraulic systems, and the like. The filter assembly 30 may be used in various industrial applications, for example, construction, mining, transport, power generation, etc. The filter assembly 30 may be used to filter contaminants from fluids in fuel systems, lubrication oil systems, hydraulic fluid power systems, hydraulic fluid control systems, transmission systems, engine air intake systems, engine exhaust systems, etc. Further, the filter assembly 30 may be used to filter diesel, gasoline, hydraulic or lubrication oil or any other liquids. In other aspects, the filter assembly 30 may be used as a water/fuel separator. Moreover, the filter assembly 30 may also be used to filter air, exhaust gases, or any other gaseous fluids.

The filter assembly 30 includes a first component or a base 32 and a second component or a housing 34 that are detachably coupled together. As shown in FIGS. 1 and 2, the base 32 and the housing 34 are substantially cylindrical in shape, however, it may be contemplated that the shapes of the base 32 and the housing 34 are merely exemplary and may be varied without deviating from the scope of the claimed subject matter. For example, the base 32 and the housing 34 may have non-cylindrical shapes, such as polygonal, elliptical, and the like. In various examples, the base 32 and/or housing 34 may include any suitable material. Examples of suitable materials include metals, polymers, resins, and the like. These and other materials may be cast, punched, pressed, machined or otherwise formed in any suitable manner.

Also shown in FIG. 2, the filter assembly 30 includes a cord member 40 with a grasping portion 42. The filter assembly 30 is configured to secure the base 32 and the housing 34 together as described herein. The grasping portion 42 is configured to provide an operator with a handle to grasp and remove the cord member 40 to disassemble the filter assembly 30 as described herein. The filter assembly 30 further includes a catch assembly 44 to retain the cord member 40 in the filter assembly 30 as also described herein. The catch assembly 44 is shown in greater detail in FIG. 3 which shows a catch housing 46 and a release 48. In addition, an access passage 56 is shown disposed in the catch assembly 44. The access passage 56 is configured to provide access into the catch assembly 44 for the cord member 40.

FIG. 4 illustrates a front sectional view of the filter assembly 30 taken along a longitudinal axis of the filter assembly 30. As shown in FIG. 4, the cord member 40 includes a tip 50, a first detent 52, and a second detent 54. With reference to FIG. 5, the cord member 40 includes a height H and a width W. Also shown in FIG. 4 and more clearly in FIG. 6, the catch assembly 44 includes a catch 60 and a biasing member 62. As described in detail herein, the biasing member 62 is configured to urge the catch 60 to engage the first detent 52 and the second detent 54 as the cord member 40 is slid into and out from the filter assembly 30.

The filter assembly 30 further includes a filter element 106 housed at least partially within the housing 34. In an aspect, the filter element 106 is removably received within the housing 34, such as in a canister type filter assembly. Alternatively, the filter element 106 is fixedly received within the housing 34.

The base 32 includes the inlet port 36 and the outlet port 38. The filter element 106 is configured to be in fluid communication with the inlet port 36 and the outlet port 38.

The inlet port 36 is configured to facilitate fluid intake into the filter assembly 30. The outlet port 38 is configured to facilitate fluid discharge from the filter assembly 30. The base 32 further includes a stepped portion 112 having a first groove 114 disposed therein. In an aspect, the first groove 114 may be a continuous annular groove disposed on an inner surface 116 of the stepped portion 112 of the base 32. Alternatively, the first groove 114 may be a discontinuous groove forming a cavity located on the inner surface 116 of the stepped portion 112. Further, the first groove 114 may have a substantially rectangular cross-section. Alternatively, the first groove 114 may have any other cross-sectional shape, such as circular, triangular, and the like. In an aspect, the first groove 114 may have a height H1 and a width W1 as shown in FIG. 7.

Further, the housing 34 includes a top end 118 and a bottom end 120. The top end 118 includes a stepped portion 122 configured to be attached to the base 32. The stepped portion 122 of the housing 34 includes a second groove 124 disposed therein. The second groove 124 is located on an outer surface 126 of the housing 34. In an aspect, the second groove 124 may be a continuous annular groove located on the outer surface 126 of the housing 34. Alternatively, the second groove 124 may also be a discontinuous groove forming a cavity similar to the one formed by the first groove 114 as explained above. The second groove 124 may have a height H2 and a width W2 as shown in FIG. 8.

In an aspect, the first groove 114 and the second groove 124 have substantially similar cross-sections. For example, similar to the first groove 114, the second groove 124 may also have a substantially rectangular cross-section. Alternatively, the second groove 124 may have any other cross-sectional shape, such as circular, triangular, and the like. In an exemplary aspect, the height H2 of the second groove 124 may also be equal to the height H1 of the first groove 114.

The filter element 106 includes a filter media 128 that may be arranged annularly about a central reservoir defined by a central tube 130. Axial ends of the filter media 128 are sealed by a top end cap 132 and a bottom end cap 134. The top end cap 132 defines an axial open end of the filter element 106. The bottom end cap 134 defines an axial closed end of the filter element 106. The top end cap 132 includes an opening (not shown) configured to facilitate passage of fluid to the outlet port 38 from the central tube 130. The bottom end cap 134 is configured to prevent any fluid outside the filter element 106, adjacent to the axial end of the filter media 128, from flowing unfiltered into the central tube 130. The top end cap 132 and the bottom end cap 134 may be joined to the central tube 130 by welding, adhesives, mechanical coupling, etc. Alternatively, some or all of the central tube 130, the top end cap 132, and the bottom end cap 134 may be constructed as unitary components.

Fluid to be filtered enters from the inlet port 36 and flows into an annular cavity 136 between the housing 34 and the filter media 128. The fluid passes into and through the filter media 128 and then into the central tube 130 via perforations 138 provided in the central tube 130. The fluid exits the central tube 130 through the top end cap 132 and the opening into the outlet port 38.

Furthermore, the filter assembly 30 includes a drain 140 releaseably coupled to the bottom end 120 of the housing 34. The drain 140 provides a channel for removing the fluid inside the housing 34. An inlet end (not shown) of the drain 140 is positioned within the housing 34 and an outlet end 144 of the drain 140 is positioned outside the housing 34. The drain 140 may be moved between an open and a closed position. It may be contemplated that in the open position, the fluid within the housing 34 may be drained out via the outlet end 144 of the drain 140.

Referring to FIGS. 9 and 11, the base 32 and the housing 34 are detachably coupled to each other at the respective stepped portions 112 and 122. The base 32 at least partially receives the housing 34. In an aspect, the stepped portion 112 of the base 32 abuts the stepped portion 122 of the housing 34, such that the first groove 114 and the second groove 124 are disposed in cooperative alignment and a channel 142 is formed therebetween. In an aspect, the channel 142 may be a continuous channel formed by the first groove 114 and the second groove 124 between the base 32 and the housing 34. Alternatively, the channel 142 may be a discontinuous channel formed by the first groove 114 and the second groove 124 when the base 32 and the housing 34 are coupled. It may be contemplated, that the cross-section of the channel 142 depends on the cross-section of the first groove 114 and the second groove 124. For example, the cross-section of the channel 142 may be substantially rectangular, square, circular or triangular, and the like. The height H3 of the channel 142 may be equal to the height H1 and H2 of the first groove 114 and the second groove 124 respectively.

The cord member 40 is configured to form a connection 148 between the base 32 and the housing 34. The connection is formed by removably inserting the cord member 40 in the channel 142 between the first groove 114 and the second groove 124. Essentially, by filling the channel 142 cord member 40 locks the first groove 114 and the second groove 124 together and prevents the base 32 from moving relative to the housing 34. The cord member 40 is inserted and/or drawn outwardly from the filter assembly 30 to lock and/or unlock, respectively, the housing 34 with the base 32. The catch assembly 44 and the first detent 52 are configured to facilitate retaining the cord member 40 in In an aspect, the cord member 40 may be a spline made up of a deformable material, such as rubber, so that when inserted in the channel 142, the cord member 40 may be deformed to fit into the channel 142. Therefore, in this aspect, a width W and/or a height H of the cord member 40 may be substantially equal to a width W3 and/or the height H3 of the channel 142 (shown in FIG. 11). It may be contemplated that the width W1 and W2 of the first groove 114 and the second groove 124 may be same or different so as to be summed up to form the channel 142 of the width W3 (W1+W2=W3). In various other aspects, the cord member 40 may be made of a polymer, plastic, resin, metal, braided wire, and/or the like. Specific examples of materials suitable for use in the cord member 40 include nylon, nylon-6,6, high density polyethylene, ultra-high molecular weight polyethylene, and the like. Therefore, in the alternative aspects, the width W and the height H of the cord member 40 may be less than or equal to the width W3 and the height H3 of the channel 142.

The cross-section of the cord member 40 is substantially similar to the cross-section of the channel 142, the first groove 114 and the second groove 124. For example, the cross-section of the cord member 40 may be substantially rectangular, circular, etc. In addition, the cord member 40 may be textured or beaded with the beads running along the axis of the cord member 40 or perpendicularly across the cord member 40.

The base 32 may include a gasket seat 154 and the housing 34 may include a gasket seat 156. A gasket 164 may be disposed between the gasket seat 154 and the gasket seat 156 to form a seal. In order to seat the gasket 164 between the gasket seat 154 and the gasket seat 156, a predetermined amount of compressive force may be applied to base 32 and the housing 34. This predetermined amount of compressive force may depend upon a variety of factors such as, for example, fluid viscosity, fluid pressure, size of the gasket 164, material properties of the gasket 164, and the like.

Figure 12:
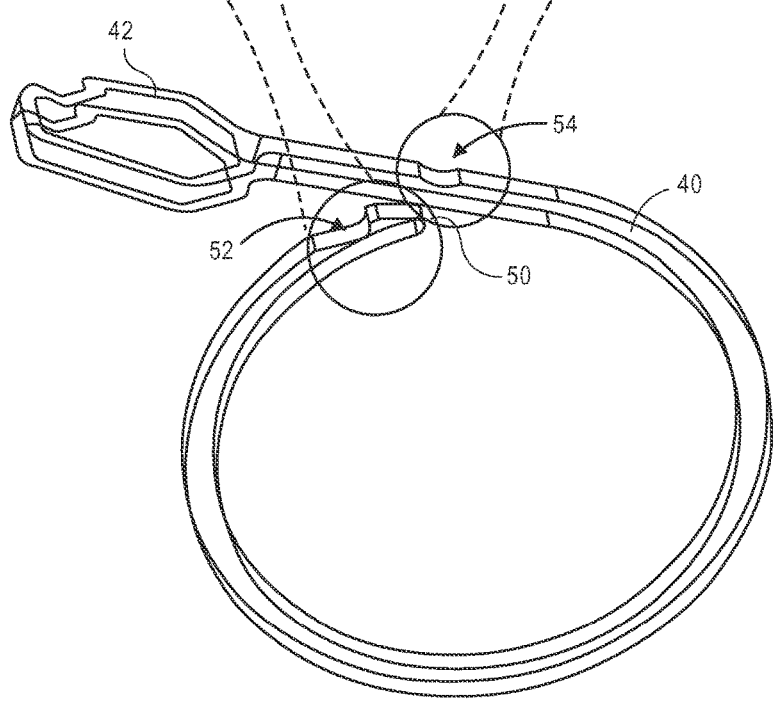
FIG. 12 is a perspective view of the cord member according to an aspect of the disclosure.

FIG. 12 is a perspective view of the cord member 40 according to an aspect of the disclosure. As shown in FIG. 12, the cord member 40 may be formed into a partial circle that generally approximates the circumference of the channel 142 shown in FIGS. 9 and 11. In this manner, the force applied to the cord member 40 to insert and withdraw the cord member into and out from the channel 142 may be reduced.

Figure 13:
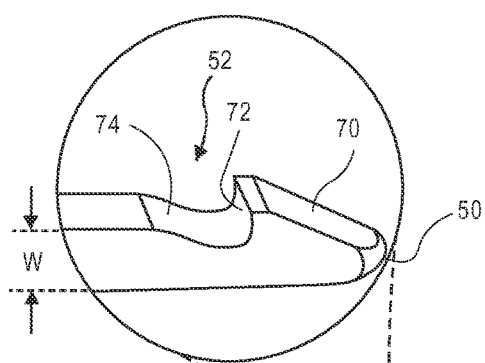
FIG. 13 is an enlarged perspective view of a first detent and a tip of the cord member according to an aspect of the disclosure.

FIG. 13 is an enlarged perspective view of the first detent 52 and the tip 50 of the cord member 40 according to an aspect of the disclosure. As shown in FIG. 13, the tip 50 is relatively smaller than the width W and the cord member 40 includes a wedging surface 70 to facilitate insertion of the cord member 40 into the catch assembly 44. More particularly, as the cord member 40 is inserted into the catch assembly 44, the wedging surface 70 is configured to urge the catch 60 (see FIG. 6) into the catch assembly 44 against the urging of the biasing member 62 so that the cord member 40 can enter the channel 142.

Figure 17:
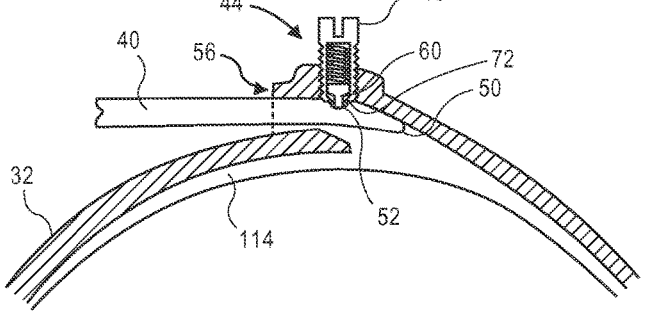
FIG. 17 is an enlarged cross sectional view through the catch assembly in a disconnected configuration according to an aspect of the disclosure.
Figure 18:
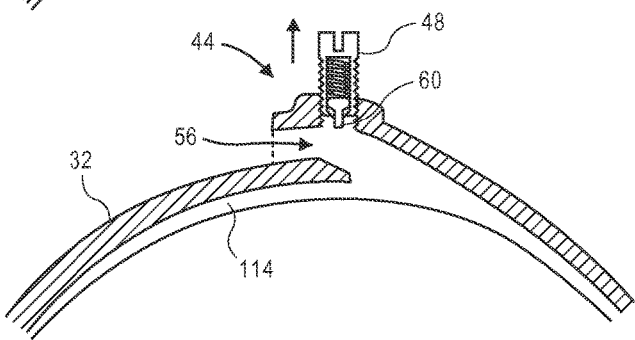
FIG. 18 is an enlarged cross sectional view through the catch assembly with the cord member removed according to an aspect of the disclosure.

The first detent 52 includes a stop surface 72 and a first sloped surface 74. As shown in FIG. 17, the stop surface 72 is configured to engage the catch 60 to stop or prevent the cord member 40 from fully withdrawing from the catch assembly 44 as shown in FIG. 17. In response to the cord member 40 being urged into the channel 142, the first sloped surface 74 is configured to urge the catch 60 into the catch assembly 44 against the urging of the biasing member 62 so that the cord member 40 can continue into the channel 142 (see FIG. 17).

Figure 14:
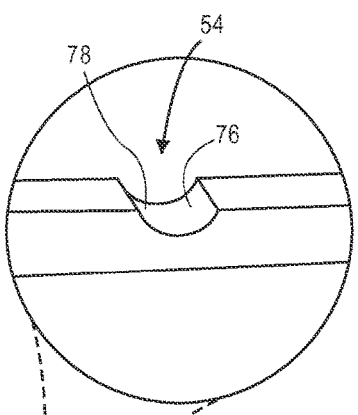
FIG. 14 is an enlarged perspective view of a second detent of the cord member according to an aspect of the disclosure.

FIG. 14 is an enlarged perspective view of the second detent 54 of the cord member 40 according to an aspect of the disclosure. The second detent 54 includes a second sloped surface 76 and a third sloped surface 78. The second sloped surface 76 is configured to provide a predetermined amount of resistance the cord member 40 being withdrawn from the channel 142 (see FIG. 15). In addition, the second sloped surface 76 is configured to allow the cord member 40 to be withdrawn from the channel 142 in response to the cord member 40 being urged from the channel 142 with sufficient force to overcome the predetermined amount of resistance. The predetermined amount of resistance may be based upon a variety of factors such as, for example: anticipated vibrational forces on the cord member 40; reasonable amount of force exerted by an operator; and the like. The amount of force sufficient to overcome the predetermined amount of resistance may be modulated by a variety of factors such as, for example: slope angle of the second sloped surface 76; force exerted by the biasing member (shown in FIG. 15); surface roughness of the second sloped surface 76 and/or the catch 60; and the like.

Figure 15:
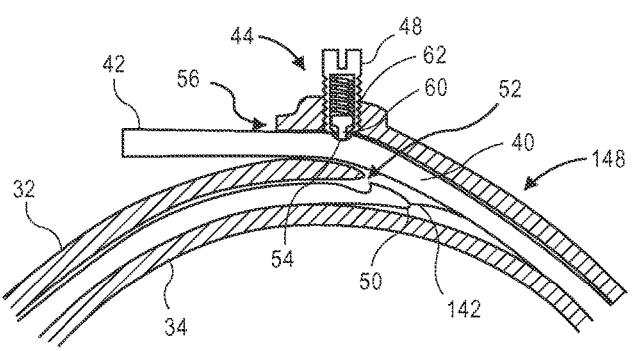
FIG. 15 is an enlarged cross sectional view through the catch assembly in a connected configuration according to an aspect of the disclosure.
Figure 16:
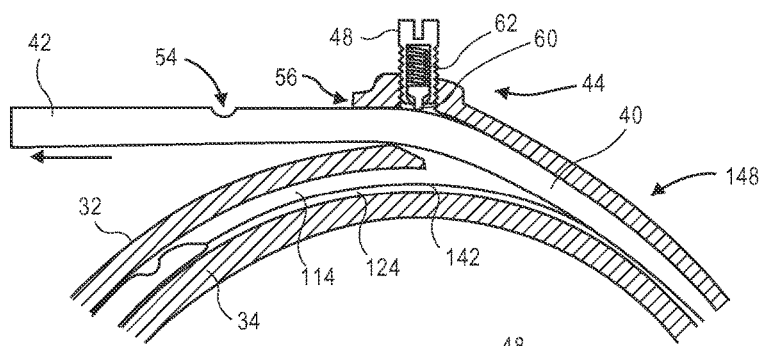
FIG. 16 is an enlarged cross sectional view through the catch assembly in a partially connected configuration according to an aspect of the disclosure.

Referring to FIGS. 15-18, the connection 148 that is formed by the cord member 40 disposed in the channel 142 is shown in FIG. 15. The cord member 40 is secured in the channel 142 via the action of the catch assembly 44 acting on the second detent 54. At FIG. 16, in response to sufficient force being exerted on the cord member 40 to overcome the resistance of the catch assembly 44 acting on the second detent 54, the cord member 40 is shown partially withdrawn from the channel 142. At FIG. 16, the cord member 40 is shown captured or stopped by the catch 60 bearing upon the stop surface 72. Also shown in FIG. 17, the connection 148 shown in FIG. 15 may be disconnected. For example, the cord member 40 may be withdrawn from the channel 142 (shown in FIG. 16) while captured by the catch assembly 44 to allow the base 32 and the housing 34 to be separated. In the particular example shown, the cord member 40 may be withdraw such that the tip 50 and first detent 52 are drawn out from the channel 142 and retained in the access passage 56.

Optionally, the cord member 40 may be removed from the catch assembly 44. For example, the release 48 may be used to retract the catch 60 from the first detent 52 to allow the cord member 40 to be withdrawn from the catch assembly 44. In a particular example, the release 48 may be configured to accept a tool bit (not shown) and the release 48 may be unthreaded from the catch assembly 44.

INDUSTRIAL APPLICABILITY

The present disclosure may be applicable to any machine including a fluid filter housing assembly. Aspects of the disclosed filter housing assembly may promote ease of use, operational flexibility, and performance of fluid filter housing assemblies in general and fuel systems in particular. In some examples, the cord member 40 may include both the first detent 52 and the second detent 54. However, in other examples, the cord member 40 may include one or the other of the first detent 52 and the second detent 54. As described herein, both the first detent 52 and the second detent 54 are configured to resist or arrest motion of the cord member. More particularly, the first detent 52 and the second detent 54 provide resistance to movement of the cord member 40 relative to the catch assembly 44. More particularly still, the first detent 52 is configured to interact with the catch assembly to substantially prevent removal of the cord member 40 from the catch assembly 44 while the second detent 54 is configured to interact with the catch assembly 44 to resist movement of the cord member 40 relative to the catch assembly until a predetermined amount of force is applied to the cord member.

The industrial applicability of the filter assembly 30 for filtering fluids and the cord member 40 will be readily understood from the foregoing discussion. The catch assembly 44, the first detent 52, and the second detent 54 of cord member 40 facilitates retaining the cord member 40 in the catch assembly 44 and securing the cord member 40 in a connected configuration. The base 32, the housing 34 and the filter element 106 may be easily disassembled by removing the cord member 40, for example to clean or change the filter element 106. The second detent 54 and the action of the catch assembly 44 provide a retentive force to further retain the cord member 40 in the channel 142 and secures the connection 148 (see FIG. 15). The first detent 52 and the action of the catch assembly 44 catches or retains the cord member 40 in the catch assembly 44 during disassembly of the filter assembly 30. It is an advantage of this configuration that loss, damage, and/or contamination of the cord member 40 may be reduced or eliminated by this retention of the cord member 40 in the catch assembly 44.

The configuration and the components of the filter assembly 30 as disclosed herein may be used in any type of filters, such as canister type or spin-on type of filters. The housing 34 and the filter element 106 may collectively be called as a replacement component of the filter assembly 30, where the replacement component may be replaced or at least detached from the base 32 for replacing the one or more components of the same.

Additionally, the stepped portion 112 of the base 32 and the stepped portion 122 of the housing 34 may be locked by using any known releasable locking mechanism and the cord member 40 and channel 142 may be included as an additional connection of the two components. Furthermore, the filter assembly 30 is easy to manufacture, and is also cost efficient. Moreover, the filter assembly 30 as disclosed herein may be utilized in any shape and size of the filter assembly 30, such as for circular or non-circular shapes.

Accordingly, aspects of the disclosure facilitate increased resistance to inadvertent disassembly of the filter assembly 30 via removal of the cord member 40 from filter assembly 30. Aspects of the disclosure may also facilitate retention of the cord member 40 in the catch assembly 44 during disassembly, inspection/replacement of the filter element 106, and/or re-assembly of the filter assembly 30.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

We claim:

1. A connection comprising:
    a first component having an opening with an inner surface and a first annular groove disposed about the inner surface;
    a second component having a top end configured to fit in the opening, the top end having an outer surface with a second annular groove disposed about the outer surface, wherein the first annular groove and the second annular groove are configured to form a channel in response to being disposed in cooperative alignment;
    a cord member configured to be removably inserted into the channel to secure the first component to the second component;
    a pair of detents disposed on the cord member, the pair of detents including
        a first detent disposed proximal to a tip of the cord member, and
        a second detent disposed distal from the tip; and
    a catch assembly configured to engage the pair of detents and provide resistance to movement of the cord member relative to the catch assembly, the catch assembly including a catch and a biasing member, the catch being configured to selectively engage the first detent and the second detent, the biasing member being configured to urge the catch forward toward the cord member.

2. The connection according to claim 1, wherein the catch assembly is configured to engage the first detent to prevent the cord member from being removed from the catch assembly.

3. The connection according to claim 2, wherein the catch assembly is configured to engage the second detent to provide a predetermined amount of resistance to movement of the cord member relative to the catch assembly, wherein the catch assembly is configured to allow the cord member to be withdrawn from the channel in response to a withdrawing force applied to the cord member exceeding the predetermined amount of resistance.

4. The connection according to claim 3, wherein the first detent includes a stop surface and a first sloped surface, the stop surface being disposed proximal to the tip and being configured to engage the catch assembly to prevent removal of the cord member from the catch assembly, the first sloped surface being disposed distal from the tip and being configured to provide resistance to insertion of the cord member into the channel.

5. The connection according to claim 4, wherein the second detent includes a second sloped surface disposed proximal to the tip and being configured to provide resistance to removal of the cord member from the channel.

6. The connection according to claim 5, wherein resistance to movement of the cord member relative to the catch assembly corresponds to an amount of force on the catch by the biasing member and a respective angle of the first sloped surface and the second sloped surface.

7. The connection according to claim 6, wherein the catch assembly includes a release to disengage the catch from the stop surface to allow the cord member to be withdrawn from the catch assembly.

8. A filter assembly comprising:
    a base having an opening with an inner surface and a first annular groove disposed about the inner surface;
    a filter housing having a top end configured to fit in the opening, the top end having an outer surface with a second annular groove disposed about the outer surface, wherein the first annular groove and the second annular groove are configured to form a channel in response to being disposed in cooperative alignment;
    a cord member configured to be removably inserted into the channel to secure the base to the filter housing;
    a a pair of detents disposed on the cord member, the pair of detents including
        a first detent disposed proximal to a tip of the cord member, and
        a second detent disposed distal from the tip; and
    a catch assembly configured to engage the pair of detents and provide resistance to movement of the cord member relative to the catch assembly, the catch assembly including a catch and a biasing member, the catch being configured to selectively engage the first detent and the second detent, the biasing member being configured to urge the catch forward toward the cord member.

9. The filter assembly according to claim 8, wherein the catch assembly is configured to engage the first detent to prevent the cord member from being removed from the catch assembly.

10. The filter assembly according to claim 9, wherein the catch assembly is configured to engage the second detent to provide a predetermined amount of resistance to movement of the cord member relative to the catch assembly, wherein the catch assembly is configured to allow the cord member to be withdrawn from the channel in response to a withdrawing force applied to the cord member exceeding the predetermined amount of resistance.

11. The filter assembly according to claim 10, wherein the first detent includes a stop surface and a first sloped surface, the stop surface being disposed proximal to the tip and being configured to engage the catch assembly to prevent removal of the cord member from the catch assembly, the first sloped surface being disposed distal from the tip and being configured to provide resistance to insertion of the cord member into the channel.

12. The filter assembly according to claim 11, wherein the second detent includes a second sloped surface disposed proximal to the tip and being configured to provide resistance to removal of the cord member from the channel.

13. The filter assembly according to claim 12, wherein resistance to movement of the cord member relative to the catch assembly corresponds to an amount of force on the catch by the biasing member and a respective angle of the first sloped surface and the second sloped surface.

14. The filter assembly according to claim 13, wherein the catch assembly includes a release to disengage the catch from the stop surface to allow the cord member to be withdrawn from the catch assembly.

15. The filter assembly according to claim 8, further comprising a filter element disposed within the filter housing.

* * * * *